(12) United States Patent
Kandala

(10) Patent No.: US 7,414,969 B2
(45) Date of Patent: Aug. 19, 2008

(54) SYSTEM AND METHOD FOR IEEE 802.11 NETWORK ADMISSION CONTROL

(75) Inventor: Srinivas Kandala, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 896 days.

(21) Appl. No.: 10/685,648

(22) Filed: Oct. 15, 2003

(65) Prior Publication Data

US 2005/0083838 A1   Apr. 21, 2005

(51) Int. Cl.
*H04L 12/26* (2006.01)

(52) U.S. Cl. ...................................... 370/230
(58) Field of Classification Search ................ None
See application file for complete search history.

(56) References Cited

U.S. PATENT DOCUMENTS

| | | | | |
|---|---|---|---|---|
| 6,115,390 | A | 9/2000 | Chuah | 370/443 |
| 6,226,277 | B1 | 5/2001 | Chuah | 370/328 |
| 7,177,275 | B2 * | 2/2007 | Stanwood et al. | 370/230 |
| 2004/0242235 | A1 * | 12/2004 | Witana | 455/452.2 |
| 2005/0089064 | A1 * | 4/2005 | Zimmerman et al. | 370/468 |
| 2005/0250509 | A1 * | 11/2005 | Choksi | 455/452.1 |
| 2006/0146863 | A1 * | 7/2006 | Spinar et al. | 370/449 |

* cited by examiner

*Primary Examiner*—Firmin Backer
*Assistant Examiner*—Rhonda Murphy
(74) *Attorney, Agent, or Firm*—Law Office of Gerald Maliszewski; Gerald Maliszewski

(57) ABSTRACT

A system and method are provided for periodic stream admission control in an IEEE 802.11 network. The method comprises: at an access point (AP), receiving a transmit specification, including a requested bandwidth, from a quality of service station (QSTA); computing $T_{temp}$, the time equivalent to the requested bandwidth; computing $T_{all}$, the time already allocated; and, computing $T_{res}$, the total time available. If $T_{temp}+T_{all}<T_{res}$, then the QSTA is admitted. If $T_{temp}+T_{all}>T_{res}$, the QSTA is not admitted. Some aspects of the method further comprise: monitoring the bandwidth of the admitted QSTA. In another aspect, the method: determines the bandwidth required by the admitted QSTA; and, modifies the bandwidth of the admitted QSTA in response to the determined QSTA requirements. In one aspect, the method: monitors channel conditions; and, modifies the bandwidth of the admitted QSTA in response to the channel conditions.

20 Claims, 2 Drawing Sheets

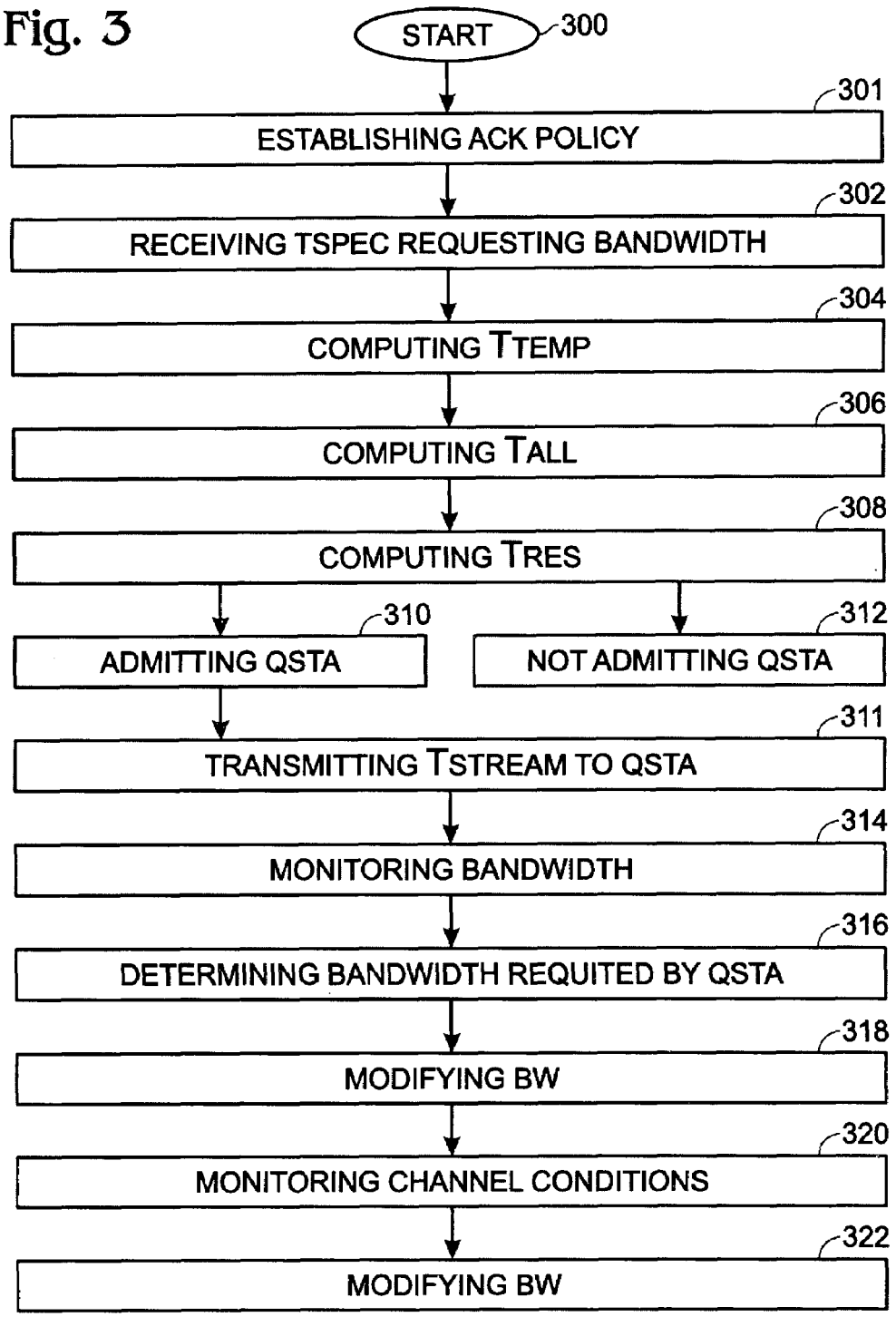

SYSTEM AND METHOD FOR IEEE 802.11 NETWORK ADMISSION CONTROL

BACKGROUND OF THE INVENTION

1. Field of the Invention

This invention generally relates to wireless local area network (wLAN) communications and, more particularly, to an admission system and method for quality of service (QoS) communications in IEEE 802.11e and IEEE 802.11 networks.

2. Description of the Related Art

For devices operating in a network that supports QoS and managed bandwidths, there is a need for an entity that provides admission control, and the reallocation of bandwidth to the admitted data streams, as needs change. Such as entity would also enforce any existing allocations. Further, the entity would ideally monitor the channel, to ensure that the streams' actual usage of bandwidth matched the requested (assigned) amount of bandwidth. All these functions would fall under the responsibility of a network bandwidth manager (BM).

In order for the bandwidth to be managed, several mechanisms and objects are needed. Each device needs to have an entity that sends the required messaging to the BM. The BM, in turn, resides in the device that contains the hybrid coordinator (HC). To avoid confusion, this device entity is referred to herein as a controller. Further, there is a need for a protocol that specifies messaging, and the processes for reserving bandwidth. The IEEE 802.11e Draft D2.0 includes one example of such messaging. RSVP (Resource ReSerVation Protocol) is another such example. RSVP is a Layer 3 protocol that may be used by Internet Protocol (IP) traffic. The controller, hence, should have the ability to support protocols at both Layer 2 as well as Layer 3.

The suggested protocols address the administration of bandwidth admission and control using a token bucket system. For example, in the IP world, it is very common to define bandwidth as a number of bytes per second. The mechanism that is used is based on a token bucket wherein each user is allowed to transmit up to rT+b bytes, in T seconds, where r and b are the mean data rate in bytes per second and maximum burst size in bytes, respectively, that have been requested/assigned to the stream. However, the token bucket mechanism is appropriate only in the case where there are multiple queues at the same node, as in a router.

Local area networks (LANs) typically use a Carrier Sense Multiple Access (CSMA) scheme, in order to support parameterized QoS. To support packet transmission meeting requirements for throughput, latency and jitter, the system must be able to allocate time on the channel in such a way that coexistence with CSMA-based transmissions is not greatly affected. Moreover, packet error rates in such systems are typically large if the medium is wireless or power-line based, typically greater than 10%.

Several solutions have been proposed to solve the problem of packet transport meeting parameterized QoS objectives. However, these proposals have been found lacking in one or more aspects. The original drafts of 802.11e included an object called a TSPEC (for Transmission Specification), but no means were provided for specifying an upper bound on channel occupancy required for admission in a given stream. Nor was any means provided for objectively verifying that a request for the transport of packets meeting specific QoS objectives could be met.

In addition, this type of TSPEC is blind to the fact that the channel makes errors, and therefore, an over-reservation of bandwidth is generally required. Moreover, this type of TSPEC cannot be used with power saving devices, since there is no guarantee of time when a sequence of packets wouldn't be delivered.

Time-based polling techniques have previously been considered. However, no time-based polling techniques have been suggested that guarantee a time when polling does not occur. Moreover, previous time-based polling techniques have failed to considered hybrid coordinator (HC) or access point (AP) negotiation; that the HC/AP must act as coordinator for allocation of time on the channel. Finally, no time-based polling techniques have considered a method for making bandwidth reservations.

It would be advantageous if effective admission policies could be developed for an IEEE 802.11 network.

It would be advantageous if assigned bandwidths in an IEEE 802.11 network could be monitored and policed.

SUMMARY OF THE INVENTION

The present invention provides a mechanism to administer admission control in QoS enabled IEEE 802.11 networks. Unlike a token bucket system of bandwidth management, the present invention works in units of time. The invention also provides a mechanism for the conversion of parameters such as data rate and maximum burst size, into an equivalent measurement of time.

Accordingly, a method is provided for periodic stream admission control in an IEEE 802.11 network. The method comprises: at an access point (AP) or HC, receiving a transmit specification, including a requested bandwidth, from a quality of service station (QSTA); computing $T_{temp}$, the time equivalent to the requested bandwidth; computing $T_{all}$, the time already allocated; and, computing $T_{res}$, the total time available. If $T_{temp}+T_{all}<T_{res}$, then the QSTA is admitted. If $T_{temp}+T_{all}>T_{res}$, the QSTA is not admitted.

Some aspects of the method further comprise: monitoring the bandwidth of the admitted QSTA. In another aspect, the method: determines the bandwidth required by the admitted QSTA; and, modifies the bandwidth of the admitted QSTA in response to the determined QSTA requirements. In one aspect, the method: monitors channel conditions; and, modifies the bandwidth of the admitted QSTA in response to the channel conditions.

The computation of $T_{temp}$ involves the computation of another variable Ttxop, the duration of the transmission opportunity in each poll. The variable Ttxop is responsive to: the network PHY parameters; the duration of the poll frame (Tpoll); the probability of pollframe transmission success (q2); and, the duration of each transmission (Ttx).

The network PHY parameters include: the short interframe spacing (Tsifs); the PCF interframe spacing (Tpifs); and, the slot duration (Tslot). Tpoll is calculated in response to the: duration of the preamble (Tpreamble); the time occupied by the signal field in the PLCP header on the channel (Tsignal); and, the duration of the OFDM symbol (Tsymbol).

More specifically, Tpoll is calculated as follows:

$$Tpoll = Tpreamble + Tsignal + \text{ceiling}(8(dpoll+3)/RTsymbol)Tsymbol;$$

where dpoll is the number of bytes in the quality of service (QoS) poll frame; and, where R is the PHY data rate in bites per second.

Ttxop is calculated as follows:

$$(Tpifs + Tpoll + Tsifs + q2Ttx + (1-q2)Tslot)/q2.$$

Additional details of the above-described method, and a system for periodic stream admission control in an IEEE 802.11 network, are provided below.

BRIEF DESCRIPTION OF THE DRAWINGS

FIG. 3 is a flowchart illustrating the present invention method for periodic stream admission control in a IEEE 802.11 network.

DETAILED DESCRIPTION OF THE PREFERRED EMBODIMENTS

Figure 1:
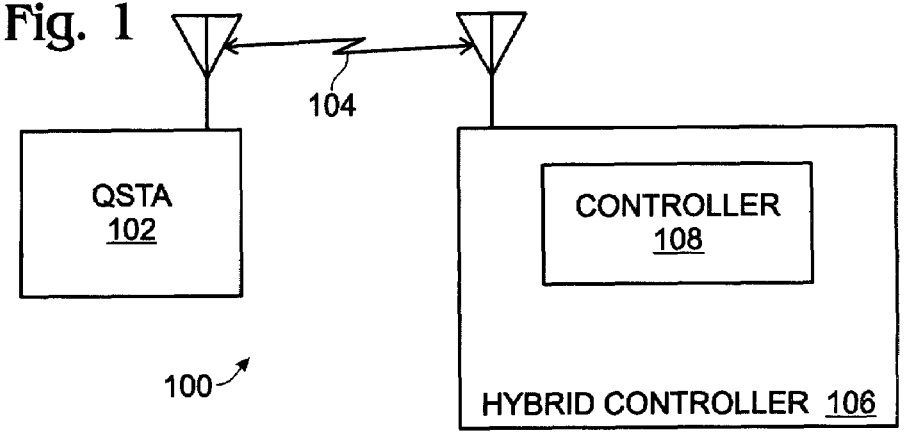
FIG. 1 is a schematic block diagram of the present invention system for periodic stream admission control in an IEEE 802.11 network.

FIG. 1 is a schematic block diagram of the present invention system for periodic stream admission control in an IEEE 802.11 network. The system 100 comprises a quality of service station (QSTA) 102 having a transceiver port to communicate a request for admission to a periodic communication stream at a requested bandwidth using a transmit specification TSPEC. The communications are depicted as wireless communication using reference designator 104, however, the invention may be enabled using other media, such as hard-wired connecting cables.

A hybrid coordinator (HC) 106, has a controller 108 with a transceiver port to receive the TSPEC from the QSTA 102. The TSPEC becomes a receiver SPEC (RSPEC) upon processing. In some aspects, the HC 106 resides with an AP (not shown). The controller 108 computes $T_{temp}$, the time equivalent to the requested bandwidth, $T_{all}$, the time already allocated, $T_{res}$, the total time available. In response to these calculations, the controller 108 supplies a request for admission response to the QSTA 102. More specifically, the controller admits the QSTA 102 if $T_{temp}+T_{all}<T_{res}$, and refuses admission to the QSTA 102 if $T_{temp}+T_{all}>T_{res}$. Although only a single QSTA is shown, the system 100 may include a plurality of QSTAs in communication with the controller 108.

In some aspects, the controller 108 monitors the bandwidth of the admitted QSTA 102. In other aspects, the controller 108 determines the bandwidth required by the admitted QSTA 102 and modifies the bandwidth of the admitted QSTA in response to the determined QSTA requirements. In yet another aspect, the controller 108 monitors channel conditions, and modifies the bandwidth of the admitted QSTA 102 in response to the channel conditions.

The controller's computation of $T_{temp}$ includes the computation of Ttxop, the duration of the transmission opportunity in each poll. Ttxop is calculated in response to: the network physical layer (PHY) parameters; the duration of the poll frame (Tpoll); the probability of pollframe transmission success (q2); and, the duration of each transmission (Ttx).

The calculation of the network PHY parameters includes the following variables: the short interframe spacing (Tsifs); the PCF interframe spacing (Tpifs); and, the slot duration (Tslot).

Tpoll is calculated in response to the: duration of the preamble (Tpreamble); the time occupied by the signal field in the PLCP header on the channel (Tsignal); and, the duration of the OFDM symbol (Tsymbol). More specifically, the controller 108 calculates Tpoll as follows:

$T\text{poll}=T\text{preamble}+T\text{signal}+\text{ceiling}(8(d\text{poll}+3)/RT\text{symbol})T\text{symbol};$ where dpoll is the number of bytes in the quality of service (QoS) poll frame; and, where R is the PHY data rate in bites per second.

The controller 108 calculates Ttxop as follows:

$(T\text{pifs}+T\text{poll}+T\text{sifs}+q2T\text{tx}+(1-q2)T\text{slot})/q2.$

The controller 108 communicates admission to the QSTA 102 by transmitting a transmit stream (Tstream) to the QSTA 102 responsive to the calculated value of Ttxop. In one aspect of the system 100, the controller 108 responds to each QSTA transmission with an immediate acknowledgement (ACK) protocol and transmits a Tstream as follows:

$T\text{stream}=(n\text{poll})(T\text{txop});$ where npoll=T/polling interval; and
T=the duration of a transmission period.

In an alternate aspect of the system 100, the controller 108 responds to QSTA transmissions with a burst ACK protocol and transmits a Tstream as follows:

$T\text{stream}=(n\text{poll})(T\text{txop});$ where npoll=T/polling interval;
T=the duration of a transmission period; and,
where Ttxop includes a data (Ttxop,d) and an acknowledgement (Ttxop,a) stream.

Then, the controller 108 calculates Ttxop,d as follows:

$T\text{txop},d=(T\text{pifs}+T\text{poll}+T\text{sifs}+q2T\text{tx},d+(1-q2)T\text{slot})/q2;$ where Ttx,d is the duration of the Ttxop assigned to data streams; and, wherein Ttxop,a is calculated as follows:

$T\text{txop},a=(T\text{pifs}+T\text{poll}+T\text{sifs}+q2T\text{tx},a+(1-q2)T\text{slot})/q2;$ where Ttx,a is the duration of the Ttxop assigned to acknowledgement streams.

Functional Description

System Architecture

Figure 2:
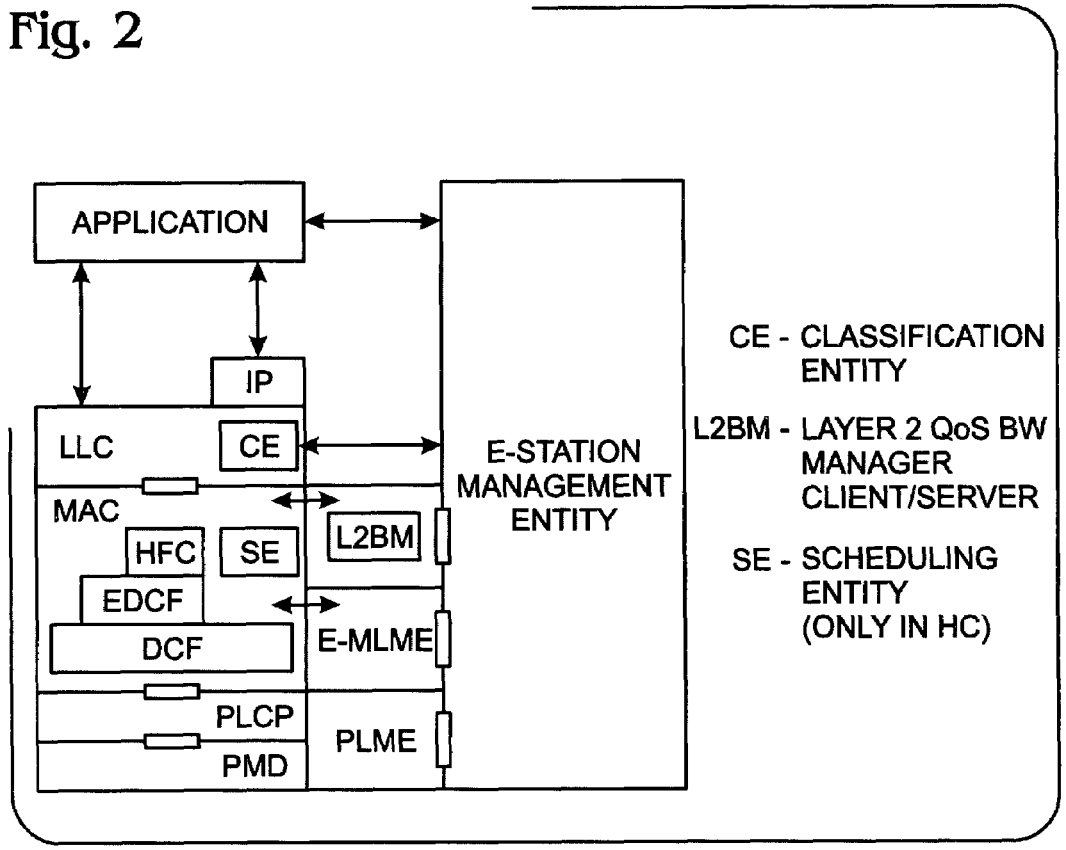
FIG. 2 is a diagram depicting the protocol layer of an IEEE 802.11e device that provides QoS support in a wLAN.

FIG. 2 is a diagram depicting the protocol layer of an IEEE 802.11e device that provides QoS support in a wLAN. The devices (QSTAs) in the present invention wLAN use the services of the controller. The MAC has all the IEEE 802.11e components. Also present in the controller is a scheduling entity (SE) that schedules TxOps for registered streams/flows by sending polls based on an algorithm. The L2BM is the bandwidth manager, or its client for the implementations that have the BM functionality at L2. Other implementations may choose to have the BM functionality at L3. The classification entity (CE) is used to filter frames based on the QoS parameters associated with the frame. The filtered information is then passed to the Enhanced-SME, which through L2BM, attempts to obtain bandwidth allocated/updated for the stream associated with that frame. In certain situations, the CE is also used to filter out frames that need to be handled in a different manner from the other frames.

Using a signaling protocol, the L2BM client in the device messages the L2BM server in the controller to seek admission, or to update a stream by sending the Sender_TSPEC of the stream. The server, based on an admission policy, determines if there is sufficient bandwidth for the stream and either admits, or reject the stream. The L2BM client subsequently may send an update message seeking to change the amount of bandwidth reserved, or may withdraw the request for bandwidth.

Signaling Protocols

As indicated above, a QoS network relies on a signaling protocol. This signaling can be provided at Layer 2 or Layer 3. Note that QoS support can be provided within the wLAN for both downstreams and upstreams. However, end-to-end QoS support cannot be guaranteed, unless there is such a provision over the entire network. An alternative way of signaling is to use an L3 messaging scheme, such as developed in RSVP. The same signaling scheme can then be used for requesting bandwidth over the network. Despite the advantage of uniformity, in some applications both source and destination are in the same subnet. Then, the device cost can be reduced somewhat by eliminating L3 messaging. Furthermore, other technologies and applications, especially using satellite networks or broadband networks, may not need bandwidth reserved over the network, and may not have any services provided at the end-point outside the home. In this situation, if there is no L2 messaging, the application has to rely on a prioritized QoS support within the wLAN, and may not be able to take advantage of the full QoS services provided by IEEE 802.11e.

With the present invention, resource reservations are typically refreshed by periodic (L2 or L3) messages containing the TSPEC. Failure to do so may cause the BM to assume that the stream is not active anymore. That is, the BM may withdraw the resources allocated to the stream and not provide any further transmission opportunities. It should be noted that the presence of L2 signaling does not prevent RSVP messaging at L3. However, there should be an interface and appropriate services between L2BM (which is only used as a messaging entity here) and the SBM (subnet bandwidth manager), the bandwidth manager that is needed to support RSVP. These services permit L2BM and SBM to implement the same admission and bandwidth control policy. Furthermore, an SBM must rely on the MLME to provide appropriate service for the measures on channel load, as well as for any policing function that the SBM enforces.

Bandwidth Manager

The BM's role is to provide admission and bandwidth control, as well as policing of the traffic on the channel. The BM processes the received RSPEC of a stream. The RSPEC might be for a new stream or for an existing stream. If it is for a new stream, the bandwidth manager determines if there are enough resources to support the new stream without disrupting the existing streams. Based upon this consideration, the BM either admits or rejects a stream. If the RSPEC is for an existing stream, and if the amount of resources that are requested is less than, or equal to, the existing resources allocated to that stream, then the stream's request should always be satisfied. If the resources requested are more than the existing allocation, then, a decision is made to ensure that there are enough resources.

The second function of the BM is the policing of the traffic on the channel. An argument can be made that this function is not needed as all the devices are expected to be compliant with the access mechanism and will not violate any channel access rules. While assumption may be correct, there is another reason for having a policing function. The TSPEC that is used by a source for defining a stream may not represent the true characteristics of the data. The allocated resources may either not be sufficient for the sustaining of the stream, or may be much more than what are required. The policing function then ensures that adequate adjustments are made to the TSPECs so that resources may be reallocated (or streams may be terminated).

The third function of the BM is to control the amount of bandwidth that is allocated, and change the allocations dynamically. For example, the BM may choose to drop unsustainable streams. The channel conditions vary with time. The BM cannot predict these variations and grants the resources to streams based on certain assumptions. It is the responsibility of the BM to ensure that these allocations are changed when the channel conditions changes. The BM monitors the stream flows and keeps track of their packet error rates, delay, and jitter. If any of these variables change beyond a tolerance level, defined for the purpose of admission control, then the BM may decide to allocate more resources, if they are available. Alternately, the BM may decide to terminate services to certain streams if more resources cannot be allocated (the stream cannot be sustained). If the channel conditions improve, the BM may decrease the amount of resources allocated to a stream. In principle, this is just an extension of the policing function, however, it is not the TSPECs that violate the guarantees, but the channel conditions.

The fourth function is the admission policy. Networks may have an established admission policy in place, like the security policy. It is also the responsibility of the BM to ensure that the policy is administered.

Admission Control

When an admission control is being used, it is imperative that there is a metric that adequately quantifies the resources that are available. In the IP world, it is very common to define bandwidth as a number of bytes per second. The mechanism that is used is based on a token bucket, wherein each user is allowed to transmit up to $rT+b$ bytes, in T seconds, where r and b are the mean data rate in bytes per second and maximum burst size in bytes, respectively, that have been requested/assigned to the stream. An equivalent metric is the amount of time that is assigned to the sender over within which data can be sent. In other words, for every pair r and b, there is an equivalent t, that can be used as a metric. The present invention reserves bandwidth using a time-based metric because the total channel access time on an IEEE 802.11e channel is divided into three different parts. They are:

time used by AP for the transmission of beacons and the traffic delivery to power saving devices, $T_{AP}$;

traffic that has been sent using the contention access of the medium; and, the rest of the duration within the superframe that can be used for contention free bursts, $T_{CFB}$.

Let the total amount of time for which resources are reserved be given by T. After assigning sufficient time for the transmission of beacons and other management frames by the AP and the EDCF (enhanced distributed coordination function) traffic, let the remaining amount of time that is available for allocation be given by $T_{res}$. At any given time, assume that the amount of resources that have already been allocated be $T_{all}$. When a request for bandwidth allocation arrives, the channel access time that will be assigned to this stream is computed. The TSPEC parameters are converted into time. Then, the algorithm outlined below can be used for determining if this arriving request should be satisfied. The TSPEC parameters that are assumed to exist, as provided in the IEEE 802.1D1.2 draft, are:

---

MLME-TSUPDATE.indication arrives with define TSPEC
Compute $T_{temp}$ the time equivalent to the TSPEC.
if stream exists
    exist ← 1

```
        out i                    % i is the stream ID.
        T_temp ← T_temp − T_stream,i
    else
        assign i
        exist ← 0
        T_stream,i ← 0
    end if
    T_update,i ← t               % t is the current time
    if T_temp ≤ 0
        Accept TSPEC
        T_stream,i ← T_temp + T_stream,i
        T_all ← T_all + T_temp
        If aperiodic
            update CT_i          % CT_i is the committed time
        endif
    elseif T_temp + T_all < T_resources
        Accept TSPEC
        T_stream,i ← T_temp + T_stream,i
        T_all ← T_all + T_temp
        If aperiodic
            update CT_i
        endif
    else
        Reject TSPEC
        if exist == 0
            free i
        endif
    endif
```

In the case of existing streams, even though a new request has been rejected, the existing stream is still in place. The resource reservation is refreshed periodically (using L2 or L3 signaling, as discussed above). A subsequent message, defining the TSPEC corresponding to the existing stream, ensures that the resources are not be withdrawn for the stream, due to a timeout. Tear down is much more straightforward and may happen either due to an explicit Delete TSPEC message, or due to a time out since the last refresh of the reservation. For aperiodic streams, tear down may also be effected by the expiry of the CT. The algorithm is given below:

```
MLME-TSUPDATE.indication arrives with define TSPEC:
if stream exists
    out i
    T_all ← T_all − T_stream,i
    free i
endif
for all streams
    if t > T_update,i + T_timeout
        out i
        T_all ← T_all − T_stream,i
        free i
    endif
    if aperiodic
        if t > T_update,i + CT_i
            out i
            T_all ← T_all − T_stream,i
            free i
        endif
    endif
endfor
```

Resource Calculation

The computation of the time equivalent TSPEC is presented below. The time equivalence is actually an expected value. While there is a great deal of variation within the channel, data flow rate into the MAC, as well as in the TXOPs presented by the scheduler, a bandwidth manager takes a longer-term outlook. Thus, the mean is a good measure for estimating the resources that can be allocated. It should be emphasized that the TXOP sizes computed in this section are averages and are not the actual TXOP sizes allocated by a scheduler. The bandwidth manager computes the average TXOP sizes only to ensure that there are enough resources, and that the stream can be serviced within the specified requirements. The scheduler takes the queue size and the near-term channel conditions into account and assigns the TXOP size dynamically, independent of the bandwidth manager computations.

There are essentially two types of data streams, periodic, which include constant and variable bit rate streams, and aperiodic, where the sources are essentially bursty.

Periodic Streams

As above, the duration of the resources being allocated is T. The total amount of reservation over this period is an allocation of a transmission opportunity (TxOp) such that B=rT+b bytes, where r and b are the mean data rate in bytes per second and maximum burst size in bytes that can be transmitted reliably over the wireless channel. If forward error correction (FEC) is used, the parameters $d_{data}$ and $d_{header}$ need to be changed to reflect the FEC overhead. Even though the values of these two parameters generally increase as a result, it should be noted that this does not necessarily mean that more resources are needed, as FEC typically increases the reliability of the channel and reduces the number of retransmissions and, thus, the retransmission bandwidth. The following is a list of some of the key parameters, they are:

PHY Parameters:

R—data rate at the PHY in bits per second $T_{sifs}$—short interframe spacing (an 802.11 constant dependent on the PHY; 16 μs for 0.11a)

$T_{pifs}$—PCF interframe spacing (an 802.11 constant dependent on the PHY; 25 μs for 0.11a)

$T_{slot}$—slot duration (an 802.11 constant dependent on the PHY; 9 μs for 0.11a)

Frame Sizes:

$d_{data}$—number of bytes in the payload of the QoS data frame (nominal MSDU size)

$d_{header}$—number of bytes in the header of the QoS data frame and the FCS field (not strictly part of the header)

$d_{poll}$—number of bytes in the QoS poll frame $d_{ack}$—number of bytes in the ACK frame Frame Counts:

$n_{poll}$—number of poll frames needed to transmit B bytes in a duration of T $$= \left\lceil \frac{T}{polling\, interval} \right\rceil$$

$n_{data}$—number of data frames that need to be transmitted in one transmission opportunity presented by a poll $$= \frac{B}{d_{data} n_{poll}}$$

n—number of retransmissions

Error Probabilities:

$p_1$—probability of a data frame transmission failure ($=1-q_1$)

$p_2$—probability of a pollframe transmission failure ($=1-q_2$)

$p_3$—probability of an ACK frame transmission failure ($=1-q_3$)

Time Parameters:

$T_{sf}$—Size of the superframe $T_{preamble}$—duration of the preamble (16 μs for 0.11a)

$T_{symbol}$—duration of an OFDM symbol (4 μs for 0.11a)

$T_{signal}$—time occupied by the signal field in the PLCP header on the channel = $T_{symbol}$ $$T_{data} - \text{duration of the data frame} = T_{preamble} + T_{signal} + \text{ceiling}\left(\frac{8(d_{header} + d_{data} + 3)}{RT_{symbol}}\right)T_{symbol}$$

$$T_{poll} - \text{duration of the poll frame} = T_{preamble} + T_{signal} + \text{ceiling}\left(\frac{8(d_{poll} + 3)}{RT_{symbol}}\right)T_{symbol}$$

$$T_{ack} - \text{duration of the ACK frame} = T_{preamble} + T_{signal} + \text{ceiling}\left(\frac{8(d_{ack} + 3)}{RT_{symbol}}\right)T_{symbol}$$

$T_{dock}$—duration of the Burst ACK frame; expected to be about the same size as a poll frame. The number "3" is added in the above three equations to account for the service field in the PLCP header and the tail bits.

$T_{TXOP}$—duration of the transmission opportunity in each poll.

It is assumed that all polls are sent through (no data)+QoS CF-Poll. Even though optimizations like piggybacking the poll frame with a data frame are desirable, and such implementations are encouraged for simplicity, it is assumed that no such optimizations are enabled for this discussion. Furthermore, an HC may not always have data to be sent to the poll recipient at any arbitrary time—this also puts undue demand on the scheduler.

Case 1: Immediate ACK

The expected amount of resources within T that are needed to satisfy the TSPEC are then given by:

$$T_{TXOP} = T_{pifs} + T_{poll} + T_{sifs} + q_2 T_{TX} + p_2(T_{slot} + T_{TXOP}) \text{ or}$$

$$T_{TXOP} = \frac{T_{pifs} + T_{poll} + T_{sifs} + q_2 T_{TX} + p_2 T_{slot}}{q_2} \text{ and} \quad (1)$$

$$T_{stream,i} = n_{poll} T_{TXOP} \quad (2)$$

Within this duration, the data is sent over $n_{poll}$ TXOPs of duration $T_{TX}$. Equation 1 provides the expected value of the amount of time of the TXOPs taking into account the possibility of the poll frame being in error. In each TXOP, $n_{data}$ frames should be sent reliably (on average). Assuming that the average amount of channel occupancy time that is used for transmitting one frame successfully (or one frame being dropped) is given by $T_{succ}$. Then:

$$T_{TX} = n_{data} T_{succ} \quad (3)$$

Let $T_{succ} = T_{succ,0}$—the duration of the channel occupancy for a frame to be either transmitted successfully or be dropped from the $0^{th}$ retry.

Then, the channel occupancy before $0^{th}, i^{th}$, and $n^{th}$ retry is given by $$T_{succ,0} = T_{data} + T_{sifs} + q_1(T_{ack} + T_{sifs}) + q_1 p_2(T_{slot} + T_{succ,1}) + p_1(T_{slot} + T_{succ,1})$$
$$= T_{data} + T_{sifs} + q_1(T_{ack} + T_{sifs}) + (q_1 p_2 + p_1)T_{slot} + (q_1 p_2 + p_1)T_{succ,1}$$

$$T_{succ,i} = T_{data} + T_{sifs} + q_1(T_{ack} + T_{sifs}) + (q_1 p_2 + p_1)T_{slot} + (q_1 p_2 + p_1)T_{succ,i+1}$$

$$T_{succ,n-1} = T_{data} + T_{sifs} + q_1(T_{ack} + T_{sifs}) + (q_1 p_2 + p_1)T_{slot} + (q_1 p_2 + p_1)T_{succ,n}$$

$$T_{succ,n} = T_{data} + T_{sifs} + q_1(T_{ack} + T_{sifs}) + (q_1 p_2 + p_1)T_{slot}$$

Then it can be shown that, $q_1 p_2 + p_1 = (1 - q_1 q_2)$ and thus $$T_{succ,0} = \frac{1 - (1 - q_1 q_2)^{n+1}}{q_1 q_2} T_{succ,n} \quad (4)$$

$$= \frac{1 - (1 - q_1 q_2)^{n+1}}{q_1 q_2} (T_{data} + T_{sifs} + q_1(T_{ack} + T_{sifs}) + (1 - q_1 q_2)T_{slot})$$

Even for moderate values of n, it can be shown that $1 - (1 - q_1 q_2)^{n+1} \approx 1$. Then, the above equation reduces to that of the case where a frame can be retried an infinite number of times and is given by $$T_{succ,0} = \frac{T_{data} + T_{sifs} + q_1(T_{ack} + T_{sifs}) + (1 - q_1 q_2)T_{slot}}{q_1 q_2} \quad (5)$$

Equations (1)-(5) can be used to determine the resources in terms of time that are needed for the case where an immediate ACK is used.

Case 2: Burst ACK

For this case, resources are allocated to two streams (assuming that there is only one receiver)—a data stream and an acknowledgement stream. Thus, the expected amount of resources that need to be allocated are given by:

$$T_{stream,i} = n_{poll}(T_{TXOP,d} + T_{TXOP,a}) \quad (6)$$

where $T_{TXOP,d}$ and $T_{TXOP,a}$ are the respective TXOPs assigned to the data and acknowledgement streams. As above, it can be shown that:

$$T_{TXOP,d} = \frac{T_{pifs} + T_{poll} + T_{sifs} + q_2 T_{TX,d} + p_2 T_{slot}}{q_2} \text{ and} \quad (7)$$

$$T_{TXOP,a} = \frac{T_{pifs} + T_{har} + T_{sifs} + q_2 T_{TX,a} + p_2 T_{slot}}{q_2} \quad (8)$$

where $T_{TX,d}$ and $T_{TX,a}$ respectively denote the (expected) duration of the TXOP that have been assigned for data and acknowledgement streams during each poll. In the data TXOP, only data frames separated by $T_{sifs}$ are sent by the sender, and any frame that is not received correctly is retransmitted up to n times. Thus:

$$T_{TX,d} = n_{data} \sum_{i=0}^{n} p_1^i (T_{data} + T_{sifs}) \quad (9)$$

$$= \left(\frac{1-p_1^{n+1}}{1-p_1}\right) n_{data}(T_{data} + T_{sifs}) \approx \left(\frac{n_{data}(T_{data} + T_{sifs})}{q_1}\right)$$

For the acknowledgement stream, it is the amount of time it takes to transmit one Burst ACK frame and the ensuing delay of PIFS that must be considered before the HC can get the control of the channel, and it is given by:

$$T_{TX,a} = T_{back} + T_{pifs} \quad (10)$$

where it is assumed that the effects of transmission failures of the Burst ACK frame are ignored. This is a reasonable assumption as the error probability of a Burst ACK frame is of the order of $10^{-3}$. It is also assumed that the polling interval of the Burst ACK stream is sufficiently small, for example, as small the data stream (a condition that can be further relaxed), so that a future Burst ACK frame can be considered as a retransmission. This is done to keep the overhead involved with the retransmission of the Burst ACK frame low. Equations (6)-(10) can be used to determine the resources needed for a stream using Burst ACK.

Aperiodic Streams

In an aperiodic stream, the transmission opportunities are spread over the Committed Time (CT). If CT is less than T, the total amount of resources allocated is within T. Otherwise, it is spread over several allocation intervals with the division of the TxOps as desired by the scheduler (even though it is recommended that they be kept equal/uniform). However, it is assumed that, at most, one transmission opportunity is sent within one superframe. Some additional parameters are:

$$n_{all} - \text{number of allocated intervals} = \left\lceil \frac{CT}{T} \right\rceil$$

$$n_{poll} - \text{number of poll frames sent in duration } T = \left\lceil \frac{T}{T_{sf}} \right\rceil$$

Thus, the amount of resources within T that are needed to satisfy the requested TSPEC are again determined by equations 1-10, with the modified definition of $n_{poll}$.

FIG. 3 is a flowchart illustrating the present invention method for periodic stream admission control in a IEEE 802.11 network. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 300.

Step 302 receives a transmit specification, including a requested bandwidth, from a QSTA, at an AP. Step 304 computes $T_{temp}$, the time equivalent to the requested bandwidth. Step 306 computes $T_{all}$, the time already allocated. Step 308 computes $T_{res}$, the total time available. Step 310 admits the QSTA $_{if}T_{temp}+T_{all}<T_{res}$. Step 312 does not admit the QSTA if $T_{temp}+T_{all}>T_{res}$.

Some aspects of the method include further steps. Step 314 monitors the bandwidth of the admitted QSTA. In another aspect, Step 316 determines the bandwidth required by the admitted QSTA. Then, Step 318 modifies the bandwidth (BW) of the admitted QSTA in response to the determined QSTA requirements. In one aspect, Step 320 monitors channel conditions. Then, Step 322 modifies the bandwidth of the admitted QSTA in response to the channel conditions.

Computing $T_{temp}$ in Step 304 includes computing Ttxop, the duration of the transmission opportunity in each poll in response to: the network PHY parameters; the duration of the poll frame (Tpoll); the probability of pollframe transmission success (q2); and, the duration of each transmission (Ttx). The network PHY parameters, in turn, include: the short interframe spacing (Tsifs); the PCF interframe spacing (Tpifs); and, the slot duration (Tslot).

Tpoll is calculated in response to the: duration of the preamble (Tpreamble); the time occupied by the signal field in the PLCP header on the channel (Tsignal); and, the duration of the OFDM symbol (Tsymbol). More specifically, Tpoll is calculated as follows:

Tpoll=Tpreamble+Tsignal+ceiling (8(dpoll+3)/RTsymbol)Tsymbol;

where dpoll is the number of bytes in the quality of service (QoS) poll frame; and, where R is the PHY data rate in bites per second.

Ttxop is calculated as follows:

(Tpifs+Tpoll+Tsifs+q2Ttx+(1−q2)Tslot)/q2.

Some aspects of the method include a Step 311 of transmitting a transmit stream (Tstream) to the QSTA responsive to the calculated value of Ttxop.

In some aspects, Step 301 establishes an immediate acknowledgement (ACK) network policy. Then, transmitting a Tstream to the QSTA responsive to the calculated value of Ttxop in Step 311 includes transmitting Tstream as follows:

Tstream=(npoll)(Ttxop);

where npoll=T/polling interval; and
T=the duration of a transmission period.

Alternately, Step 301 establishes a burst ACK network policy. Then, transmitting a Tstream to the QSTA responsive to the calculated value of Ttxop in Step 311 includes transmitting Tstream as follows:

Tstream=(npoll)(Ttxop);

where npoll=T/polling interval;
T=the duration of a transmission period;
where Ttxop includes a data (Ttxop,d) and an acknowledgement (Ttxop,a) stream; and,
where Ttxop,d is calculated as follows:

Ttxop,d=(Tpifs+Tpoll+Tsifs+q2Ttx,d+(1−q2)Tslot)/q2;

where Ttx,d is the duration of the Ttxop assigned to data streams; and,
wherein Ttxop,a is calculated as follows:

Ttxop,a=(Tpifs+Tpoll+Tsifs+q2Ttx,a+(1−q2)Tslot)/q2;

and,
where Ttx,a is the duration of the Ttxop assigned to acknowledgement streams.

A system and method have been provided for granting network QoS service admission, monitoring assigned bandwidths, and modifying assigned bandwidths in response to changing channel conditions and/or inaccurately estimated needs. Examples have been given as to how a time-based reservation and monitoring service can be enabled in an IEEE 802.11 network. However, the invention is not limited to merely this example. Likewise, the invention is not limited to merely wLAN and IEEE 802.11 networks. Other variations and embodiments of the invention will occur to those skilled in the art.

I claim:

1. In a IEEE 802.11 network, a method for periodic stream admission control, the method comprising:
at an access point (AP), receiving a transmit specification, including a requested bandwidth, from a quality of service station (QSTA);
converting transmit specification parameters into time;
computing $T_{temp}$, the transmission time equivalent to the requested bandwidth and Ttxop, the duration of the transmission opportunity in each poll in response to:
the network physical layer (PHY) parameters including the short interframe spacing (Tsifs), the PCF interframe spacing (Tpifs), and the slot duration (Tslot);
the duration of the poll frame (Tpoll), wherein Tpoll is calculated in response to the duration of the preamble (Tpreamble), the time occupied by the signal field in the PLCP header on the channel (Tsignal), and the duration of the OFDM symbol (Tsymbol);
the probability of pollframe transmission success (q2); and,
the duration of each transmission (Ttx);
computing $T_{all}$, the transmission time already allocated;
computing $T_{res}$, the total transmission time available;
if $T_{temp}+T_{all}<T_{res}$, admitting the QSTA; and,
if $T_{temp}+T_{all}>T_{res}$, not admitting the QSTA.

2. The method of claim 1 wherein Tpoll is calculated as follows:

$$Tpoll=Tpreamble+Tsignal+\text{ceiling }(8(dpoll+3)/RTsymbol)Tsymbol;$$

where dpoll is the number of bytes in the quality of service (QoS) poll frame; and,
where R is the PHY data rate in bites per second.

3. The method of claim 2 wherein Ttxop is calculated as follows:

$$(Tpifs+Tpoll+Tsifs+q2Ttx+(1-q2)Tslot)/q2.$$

4. The method of claim 3 further comprising:
transmitting a transmit stream (Tstream) to the QSTA responsive to the calculated value of Ttxop.

5. The method of claim 4 further comprising:
establishing an immediate acknowledgement (ACK) network policy; and,
wherein transmitting a Tstream to the QSTA responsive to the calculated value of Ttxop includes transmitting Tstream as follows:

$$Tstream=(npoll)(Ttxop);$$

where npoll=T/polling interval; and
T=the duration of a transmission period.

6. The method of claim 4 further comprising:
establishing a burst ACK network policy; and,
wherein transmitting a Tstream to the QSTA responsive to the calculated value of Ttxop includes transmitting Tstream as follows:

$$Tstream=(npoll)(Ttxop);$$

where npoll=T/polling interval;
T=the duration of a transmission period; and,
where Ttxop includes a data (Ttxop,d) and an acknowledgement (Ttxop,a) stream.

7. The method of claim 6 wherein Ttxop,d is calculated as follows:

$$Ttxop,d=(Tpifs+Tpoll+Tsifs+q2Ttx,d+(1-q2)Tslot)/q2;$$

where Ttx,d is the duration of the Ttxop assigned to data streams; and,
wherein Ttxop,a is calculated as follows:

$$Ttxop,a=(Tpifs+Tpoll+Tsifs+q2Ttx,a+(1-q2)Tslot)/q2;$$

and,
where Ttx,a is the duration of the Ttxop assigned to acknowledgement streams.

8. The method of claim 1 further comprising:
monitoring the bandwidth of the admitted QSTA.

9. The method of claim 1 further comprising:
determining the bandwidth required by the admitted QSTA; and,
modifying the bandwidth of the admitted QSTA in response to the determined QSTA requirements.

10. The method of claim 1 further comprising:
monitoring channel conditions; and,
modifying the bandwidth of the admitted QSTA in response to the channel conditions.

11. In a IEEE 802.11 network, a system for periodic stream admission control, the system comprising:
a quality of service station (QSTA) having a transceiver port to communicate a request for admission to a periodic communication stream at a requested bandwidth using a transmit specification TSPEC; and,
a hybrid coordinator (HC), having a controller with a transceiver port to receive the TSPEC from the QSTA, to convert TSPEC parameters into time, to compute $T_{temp}$ and $T_{txop}$, the duration of the transmission opportunity in each poll, which is responsive to the network physical layer (PHY) parameters including the short interframe spacing (Tsifs), the PCF interframe spacing (Tpifs), and the slot duration (Tslot), the duration of the poll frame (Tpoll), which is responsive to the duration of the preamble (Tpreamble), the time occupied by the signal field in the PLCP header on the channel (Tsignal), and the duration of the OFDM symbol (Tsymbol), the probability of pollframe transmission success (q2), and the duration of each transmission (Ttx), the controller computing the transmission time equivalent to the requested bandwidth, $T_{all}$, the transmission time already allocated, $T_{res}$, the total transmission time available, the controller admitting the QSTA if $T_{temp}+T_{all}<T_{res}$, and refusing admission to the QSTA if $T_{temp}+T_{all}>T_{res}$.

12. The system of claim 11 wherein the controller calculates Tpoll as follows:

$$Tpoll=Tpreamble+Tsignal+\text{ceiling }(8(dpoll+3)/RTsymbol)Tsymbol;$$

where dpoll is the number of bytes in the quality of service (QoS) poll frame; and,
where R is the PHY data rate in bites per second.

13. The system of claim 12 wherein the controller calculates Ttxop as follows:

$$(Tpifs+Tpoll+Tsifs+q2Ttx+(1-q2)Tslot)/q2.$$

14. The system of claim 13 wherein the controller communicates admission to the QSTA by transmitting a transmit stream (Tstream) to the QSTA responsive to the calculated value of Ttxop.

15. The system of claim 14 wherein the controller responds to each QSTA transmission with an immediate acknowledgement (ACK) protocol and transmits a Tstream as follows:

$$Tstream=(npoll)(Ttxop);$$

where npoll=T/polling interval; and
T=the duration of a transmission period.

16. The system of claim 14 wherein the controller responds to QSTA transmissions with a burst ACK protocol and transmits a Tstream as follows:

$$T\text{stream}=(n\text{poll})(T\text{txop});$$

where npoll=T/polling interval;

T=the duration of a transmission period; and, where Ttxop includes a data (Ttxop,d) and an acknowledgement (Ttxop,a) stream.

17. The system of claim 16 wherein the controller calculates Ttxop,d as follows:

$$T\text{txop},d=(T\text{pifs}+T\text{poll}+T\text{sifs}+q2T\text{tx},d+(1-q2)T\text{slot})/q2;$$

where Ttx,d is the duration of the Ttxop assigned to data streams; and, wherein Ttxop,a is calculated as follows:

$$T\text{txop},a=(T\text{pifs}+T\text{poll}+T\text{sifs}+q2T\text{tx},a+(1-q2)T\text{slot})/q2;$$

and, where $T_{tx}$,a is the duration of the $T_{txop}$ assigned to acknowledgement streams.

18. The system of claim 11 wherein the controller monitors the bandwidth of the admitted QSTA.

19. The system of claim 11 wherein the controller determines the bandwidth required by the admitted QSTA and modifies the bandwidth of the admitted QSTA in response to the determined QSTA requirements.

20. The system of claim 11 wherein the controller monitors channel conditions and modifies the bandwidth of the admitted QSTA in response to the channel conditions.

* * * * *